US010616869B2

(12) United States Patent
Chen et al.

(10) Patent No.: US 10,616,869 B2
(45) Date of Patent: Apr. 7, 2020

(54) UPLINK CHANNEL DESIGN FOR SLOT-BASED TRANSMISSION TIME INTERVAL (TTI)

(71) Applicant: QUALCOMM Incorporated, San Diego, CA (US)

(72) Inventors: Wanshi Chen, San Diego, CA (US); Peter Gaal, San Diego, CA (US); Yongbin Wei, La Jolla, CA (US); Hao Xu, San Diego, CA (US); Shimman Arvind Patel, San Diego, CA (US); Seyedkianoush Hosseini, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/414,370

(22) Filed: Jan. 24, 2017

(65) Prior Publication Data

US 2017/0238305 A1 Aug. 17, 2017

Related U.S. Application Data

(60) Provisional application No. 62/294,958, filed on Feb. 12, 2016.

(51) Int. Cl.
*G08C 17/00* (2006.01)
*H04W 72/04* (2009.01)
(Continued)

(52) U.S. Cl.
CPC ....... *H04W 72/0413* (2013.01); *H04L 1/0018* (2013.01); *H04L 5/0053* (2013.01);
(Continued)

(58) Field of Classification Search
CPC ................................................. H04W 72/0413
See application file for complete search history.

(56) References Cited

U.S. PATENT DOCUMENTS

2004/0203980 A1* 10/2004 Das ..................... H04W 52/286
455/522
2006/0057978 A1* 3/2006 Love ..................... H04L 1/0007
455/127.1
(Continued)

FOREIGN PATENT DOCUMENTS

EP         3389208 A1   10/2018
WO    2014166122 A1   10/2014
(Continued)

OTHER PUBLICATIONS

Ericsson: "DCI for short TTI uplink transmissions," 3GPP Draft; [LATRED] R1-160938_UL_DCI, 3rd Generation Partnership Project (3GPP), Mobile Competence Centre; 650, Route Des Lucioles; F-06921 Sophia-Antipolis Cedex; France, vol. RAN WG1, No. Malta; 20160215-20160219, Feb. 6, 2016, XP051064067, Retrieved from the Internet: URL: http://www.3gpp.org/ftp/tsg_ran/WG1_RL1/TSGR1_84/Docs/ [retrieved on Feb. 6, 2016] section 2, figure 1, table 1.
(Continued)

*Primary Examiner* — Gerald A Smarth
(74) *Attorney, Agent, or Firm* — Anthony R. Morris

(57) ABSTRACT

Certain aspects of the present disclosure provide techniques that may be used to help enable low latency communications between a user equipment (UE) and a base station (BS) using quick uplink channels that enable a reduced transmission time interval (TTI). An example method generally includes identifying a plurality of slots in a subframe, receiving a resource configuration for an uplink channel,
(Continued)

wherein the resource configuration is associated with a first slot of the plurality of slots, determining a resource for transmitting the uplink channel in a second slot of the plurality of slots, wherein the resource is determined based on the resource configuration associated with the first slot of the plurality of slots, and transmitting the uplink channel in the second slot using the determined resource.

24 Claims, 16 Drawing Sheets

(51) Int. Cl.
- *H04L 1/00* (2006.01)
- *H04L 5/00* (2006.01)
- *H04W 52/38* (2009.01)
- *H04W 74/08* (2009.01)
- *H04W 52/06* (2009.01)
- *H04W 72/12* (2009.01)

(52) U.S. Cl.
CPC ........... *H04L 5/0082* (2013.01); *H04W 52/06* (2013.01); *H04W 52/38* (2013.01); *H04W 72/0446* (2013.01); *H04W 74/0833* (2013.01); *H04W 72/1284* (2013.01)

(56) References Cited

U.S. PATENT DOCUMENTS

| | | | |
|---|---|---|---|
| 2008/0220806 A1* | 9/2008 | Shin | H04W 52/08 455/522 |
| 2009/0196333 A1* | 8/2009 | Cozzo | H04L 25/0204 375/225 |
| 2009/0290559 A1* | 11/2009 | Pelletier | H04L 1/189 370/336 |
| 2012/0113907 A1* | 5/2012 | Baldemair | H04W 52/146 370/329 |
| 2015/0223234 A1* | 8/2015 | Seo | H04W 52/146 370/329 |
| 2015/0358111 A1* | 12/2015 | Marinier | H04L 1/0026 370/329 |
| 2015/0373739 A1* | 12/2015 | Seo | H04W 72/04 370/329 |
| 2016/0029239 A1* | 1/2016 | Sadeghi | H04W 24/10 370/252 |
| 2016/0192376 A1* | 6/2016 | Lee | H04W 48/20 370/252 |

FOREIGN PATENT DOCUMENTS

| | | |
|---|---|---|
| WO | 2015116866 A1 | 8/2015 |
| WO | 2016040290 A1 | 3/2016 |

OTHER PUBLICATIONS

LG Electronics: "Discussion on PUCCH Design for Latency Reduction," 3GPP Draft; R1-160654 Discussion on PUCCH Design for Latency Reduction, 3rd Generation Partnership Project (3GPP), Mobile Competence Centre; 650, Route Des Lucioles; F-06921 Sophia-Antipolis Cedex; vol. RAN WG1, No. St Julian's, Malta; 20160215-20160219, Feb. 6, 2016, XP051064291, Retrieved from the Internet: URL: http://www.3gpp.org/ftp/tsg_ran/WG1_RL1/TSGR1_84/Docs/ [retrieved on Feb. 6, 2016] section 2.1.

Partial International Search Report—PCT/US2017/014911—ISA/EPO—dated Apr. 10, 2017.

International Search Report and Written Opinion—PCT/US2017/014911—ISA/EPO—dated Jun. 6, 2017.

Samsung: "Specification Impact for UL due to TTI Shortening," 3GPP Draft; R1-160586—Specification Impact for UL Due to TTI Shortening, 3rd Generation Partnership Project (3GPP), Mobile Competence Centre; 650, Route Des Lucioles; F-06921 Sophia-Antipolis Cedex, vol. RAN WG1, No. St. Julian's, Malta; 20160215-20160219, Feb. 5, 2016, XP051064033, 3 Pages, Retrieved from the Internet: URL: http://www.3gpp.org/ftp/tsg_ran/WG1_RL1/TSGR1_84/Docs/ [retrieved on Feb. 5, 2016].

European Search Report—EP19163890—Search Authority—The Hague—dated Jul. 22, 2019.

Samsung: "Study on Specification Impact for Uplink due to TTI Shortening", 3GPP Draft; R1-156822, 3rd Generation Partnership Project (3GPP), Mobile Competence Centre ; 650, Route Des Lucioles ; F-06921 Sophia-Antipolis Cedex; France, vol. RAN WG1, No. Anaheim, USA; 20151115-20151122, Nov. 15, 2015 (Nov. 15, 2015), XP051003182, 3 Pages, Retrieved from the Internet: URL:http://www.3gpp.org/ftp/Meetings_3GPP_SYNC/RAN1/Docs/ [retrieved on Nov. 15, 2015].

\* cited by examiner

UPLINK CHANNEL DESIGN FOR SLOT-BASED TRANSMISSION TIME INTERVAL (TTI)

CROSS-REFERENCE TO RELATED APPLICATIONS

This application claims benefit of U.S. Provisional Patent Application Ser. No. 62/294,958, entitled "Uplink Channel Design for Slot-Based Transmission Time Interval," filed Feb. 12, 2016 and assigned to the assignee hereof, the contents of which are herein incorporated by reference.

BACKGROUND

I. Field

The present disclosure relates generally to communication systems, and more particularly, to uplink channel designs for use with reduced transmission time intervals (TTIs).

II. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, an eNodeB may receive data from a plurality of UEs over a shared uplink channel called the Physical Uplink Shared Channel (PUSCH). In addition, control information associated with the PUSCH may be transmitted to the eNodeB by the UE via a Physical Uplink Control Channel (PUCCH) and/or an Enhanced PUCCH (ePUCCH).

SUMMARY

Aspects of the present disclosure relate to uplink channel designs in a wireless communication system.

Certain aspects of the present disclosure provide a method for wireless communications. The method generally includes identifying a plurality of slots in a subframe, receiving a resource configuration for an uplink channel, wherein the resource configuration is associated with a first slot of the plurality of slots, determining a resource for transmitting the uplink channel in a second slot of the plurality of slots, wherein the resource is determined based on the resource configuration associated with the first slot of the plurality of slots, and transmitting the uplink channel in the second slot using the determined resource.

Certain aspects of the present disclosure provide a method for wireless communications. The method generally includes using a first set of power control parameters for transmitting a first type of control channel using a first transmission time interval (TTI) duration, and using a second set of power control parameters for transmitting a second type of control channel using a second TTI duration.

Certain aspects of the present disclosure provide a method for wireless communications. The method generally includes detecting that the UE is scheduled to transmit, within a same subframe, a first type of channel having a first transmission time interval (TTI) duration spanning at least two slots of the subframe and a second type of channel having a second transmission time interval (TTI) duration spanning a single slot of the subframe, and deciding, based on one or more conditions, whether to transmit the first type of channel, the second type of channel, or both, within the subframe.

Certain aspects of the present disclosure provide a method for wireless communications. The method generally includes selecting, from at least a first set of resources and a second set of resources, a set of resources to use for a random access channel (RACH) procedure based, at least in part, on one or more conditions, transmitting a PRACH to a node, according to the selected set of resources, and monitoring for a random access grant transmitted from the node using a TTI duration dependent on the selected set of resources.

Certain aspects of the present disclosure provide an apparatus for wireless communications. The apparatus generally includes at least one processor configured to identify a plurality of slots in a subframe, receiving a resource configuration for an uplink channel, wherein the resource configuration is associated with a first slot of the plurality of slots, determine a resource for transmitting the uplink channel in a second slot of the plurality of slots, wherein the resource is determined based on the resource configuration associated with the first slot of the plurality of slots, and transmit the uplink channel in the second slot using the determined resource.

Certain aspects of the present disclosure provide an apparatus for wireless communications. The apparatus generally includes at least one processor configured to use a first set of power control parameters for transmitting a first type of control channel using a first transmission time interval (TTI) duration, and use a second set of power control parameters for transmitting a second type of control channel using a second TTI duration.

Certain aspects of the present disclosure provide an apparatus for wireless communications. The apparatus generally includes at least one processor configured to detect that the UE is scheduled to transmit, within a same subframe, a first type of channel having a first transmission time interval (TTI) duration spanning at least two slots of the subframe and a second type of channel having a second transmission time interval (TTI) duration spanning a single slot of the subframe, and decide, based on one or more conditions, whether to transmit the first type of channel, the second type of channel, or both, within the subframe.

Certain aspects of the present disclosure provide an apparatus for wireless communications. The apparatus generally includes at least one processor configured to select, from at least a first set of resources and a second set of resources, a set of resources to use for a random access channel (RACH) procedure based, at least in part, on one or more conditions, transmit a PRACH to a node, according to the selected set of resources, and monitor for a random access grant transmitted from the node using a TTI duration dependent on the selected set of resources.

Certain aspects of the present disclosure provide a computer readable medium having computer executable code stored thereon for wireless communications. The computer executable code generally includes code for identifying a plurality of slots in a subframe, receiving a resource configuration for an uplink channel, wherein the resource configuration is associated with a first slot of the plurality of slots, code for determining a resource for transmitting the uplink channel in a second slot of the plurality of slots, wherein the resource is determined based on the resource configuration associated with the first slot of the plurality of slots, and code for transmitting the uplink channel in the second slot using the determined resource.

Certain aspects of the present disclosure provide a computer readable medium having computer executable code stored thereon for wireless communications. The computer executable code generally includes code for using a first set of power control parameters for transmitting a first type of control channel using a first transmission time interval (TTI) duration, and code for using a second set of power control parameters for transmitting a second type of control channel using a second TTI duration.

Certain aspects of the present disclosure provide a computer readable medium having computer executable code stored thereon for wireless communications. The computer executable code generally includes code for detecting that the UE is scheduled to transmit, within a same subframe, a first type of channel having a first transmission time interval (TTI) duration spanning at least two slots of the subframe and a second type of channel having a second transmission time interval (TTI) duration spanning a single slot of the subframe, and code for deciding, based on one or more conditions, whether to transmit the first type of channel, the second type of channel, or both, within the subframe.

Certain aspects of the present disclosure provide a computer readable medium having computer executable code stored thereon for wireless communications. The computer executable code generally includes code for selecting, from at least a first set of resources and a second set of resources, a set of resources to use for a random access channel (RACH) procedure based, at least in part, on one or more conditions, code for transmitting a PRACH to a node, according to the selected set of resources, and code for monitoring for a random access grant transmitted from the node using a TTI duration dependent on the selected set of resources.

Certain aspects of the present disclosure also include various apparatuses and computer program products capable of performing the operations described above.

DETAILED DESCRIPTION

Figure 1:
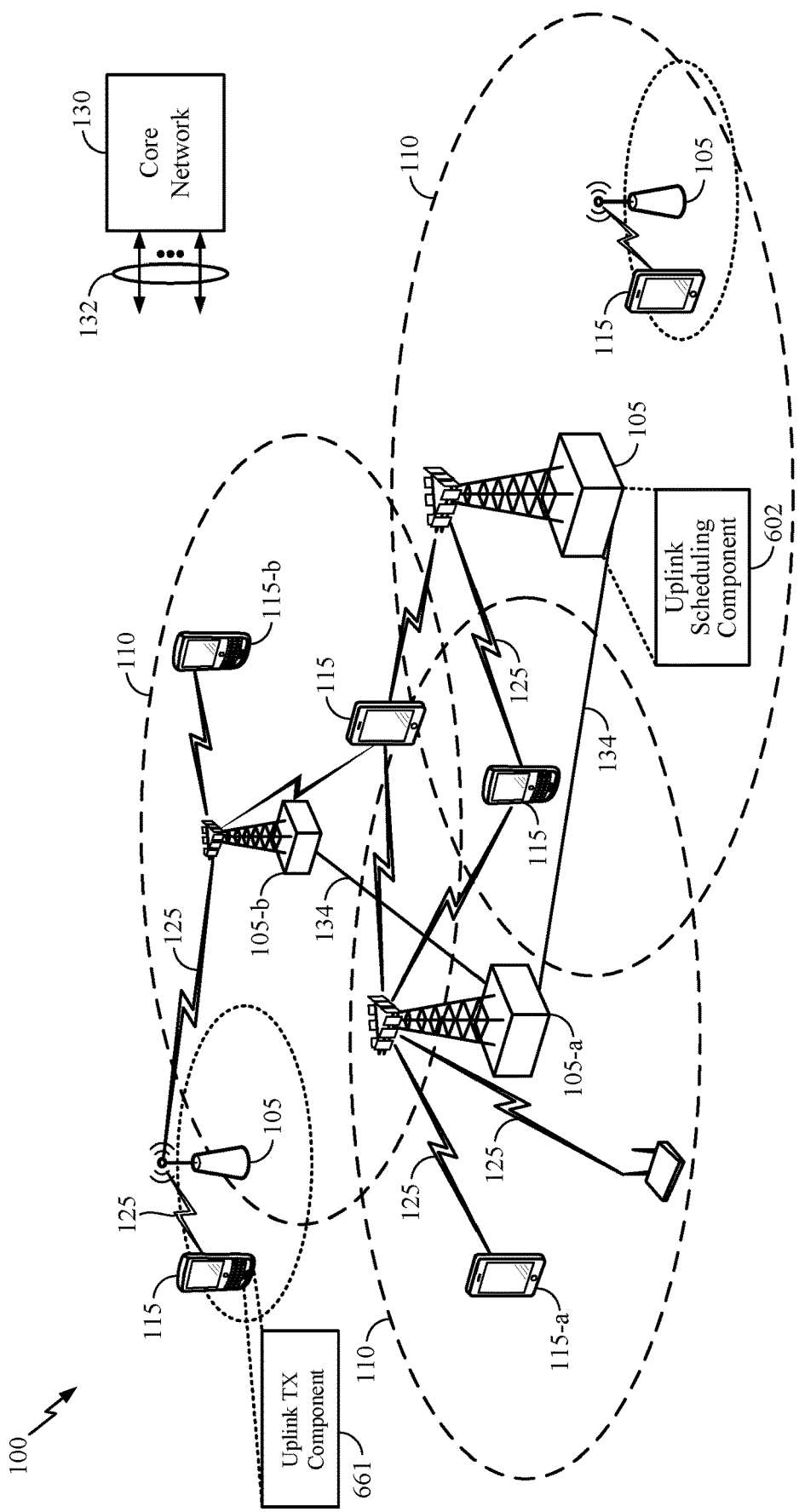
FIG. 1 shows a block diagram conceptually illustrating an example of a telecommunications system, in accordance with an aspect of the present disclosure.

Certain aspects of the present disclosure relate to uplink channel designs for slot-based transmission time intervals (TTIs). The uplink channel designs may provide for coexistence of legacy uplink channels and uplink channels that are transmitted using a reduced TTI relative to a legacy uplink channel (e.g., a channel using a subframe-based TTI).

The techniques presented herein may help reduce latency as compared to legacy uplink transmission, using quick uplink data and control channels. For purposes of the present disclosure, any channel that may have a transmission time interval (TTI) of a single slot (or a portion of a single slot) may be referred to as a Quick channel. These Quick channels may include, in a non-limiting aspect, a Quick Physical Uplink Control Channel (QPUCCH), a Quick Enhanced Physical Uplink Control Channel (QEPUCCH), and a Quick Physical Uplink Shared Channel (QPUSCH). Furthermore, a Quick channel as described in the present disclosure may have one or more channels or resource element blocks that are or can be allocated, assigned, or divided on a per-slot basis and/or have a TTI of 0.5 ms.

Moreover, certain aspects of the present disclosure additionally implement frame scheduling of legacy channels (e.g., PDCCH, EPDCCH, PDSCH) alongside the Quick channel (e.g., QPUCCH, QEPUCCH, QPUSCH). The methods and apparatus described herein may be implemented for applications that are configured to utilize Quick channel scheduling and/or legacy scheduling. As the Quick channel scheduling methods described herein may utilize a 0.5 ms TTI rather than the 1 ms TTI of legacy, these methods may increase communication rates and may cut a round-trip time (RTT) associated with legacy hybrid automatic repeat request (HARD) procedures in half (e.g., from 8 ms to 4 ms or less).

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive machine type communications (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The techniques described herein may be used for various wireless communication networks such as LTE, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as NR (e.g., 5G radio access), Evolved UTRA (E-UTRA), IEEE 802.11 (Wi-Fi), IEEE 802.16 (WiMAX), IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). NR is an emerging wireless communications technology under development in conjunction with the 5G Technology Forum (5GTF). These communications networks are merely listed as examples of networks in which the techniques described in this disclosure may be applied; however, this disclosure is not limited to the above-described communications network. For clarity, while aspects may be described herein using terminology commonly associated with 3G and/or 4G wireless technologies, aspects of the present disclosure can be applied in other generation-based communication systems, such as NR technologies, including 5G and later.

Referring first to FIG. 1, a diagram illustrates an example of a wireless communications system 100, in which aspects of the present disclosure may be performed, for example, to manage communications in the wireless communication system using enhanced downlink control channel to reduce transmission time interval (TTI) for low latency communications using quick uplink channels.

The wireless communications system 100 includes a plurality of access points (e.g., base stations, eNBs, or WLAN access points) 105, a number of user equipment (UEs) 115, and a core network 130. Access points 105 may include an uplink scheduling component 602 configured to expedite communication of control information and user data with the number of UEs 115 using a Quick LTE channel which may include a TTI of one slot for some RE blocks. Similarly, one or more of UEs 115 may include an uplink transmitter component 661 configured to transmit and operate using Quick LTE channel structure. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, an access point 105-a may acknowledge receipt of a transmission by providing ACK/NACK for the transmission through, for example, a HARQ scheme. Acknowledgments from the access point 105-a for transmissions in the first hierarchical layer may be provided, in some examples, after a predefined number of subframes following the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation (CA) to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined with other techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
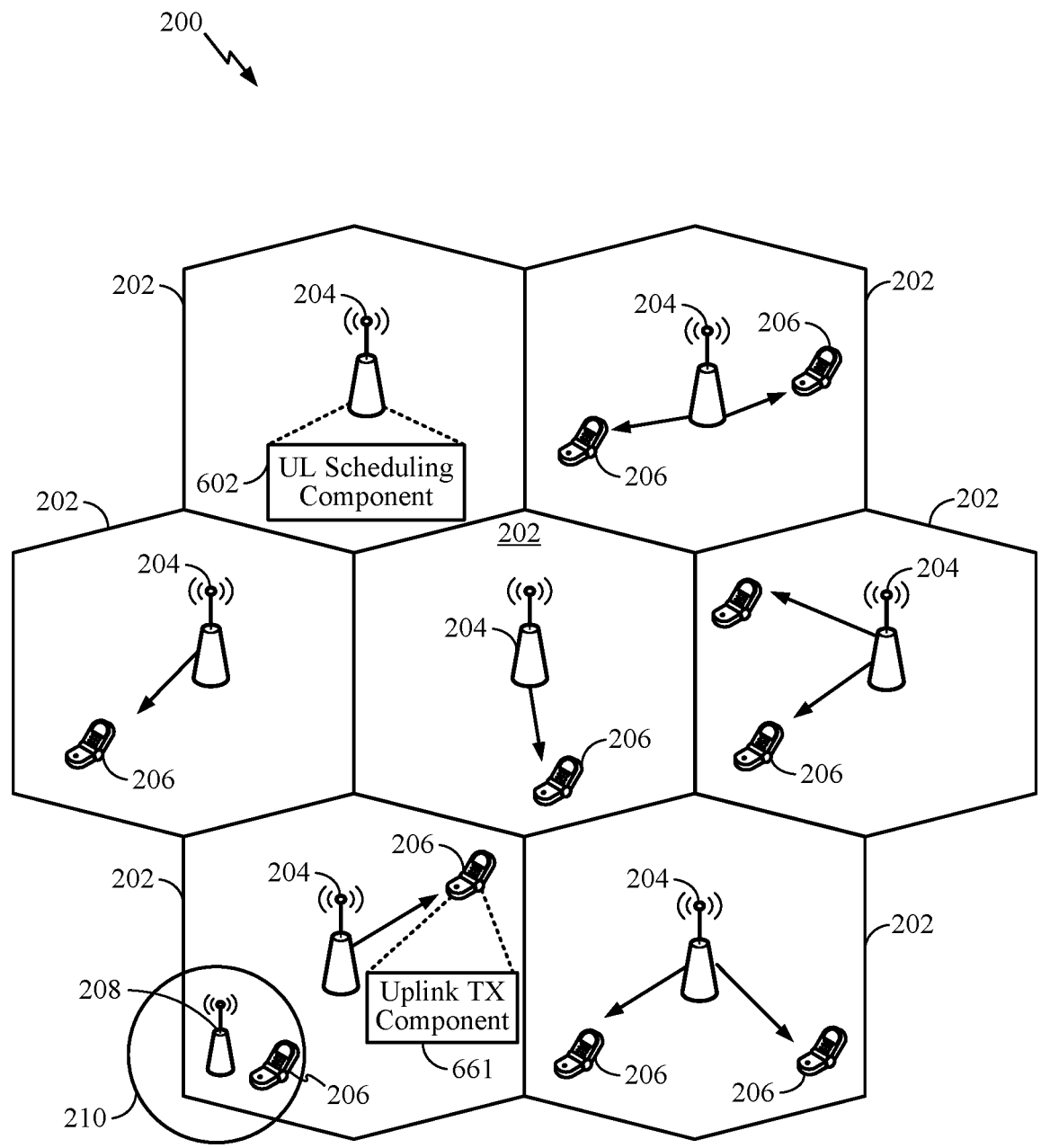
FIG. 2 is a diagram illustrating an example of an access network, in accordance with an aspect of the present disclosure.

FIG. 2 is a diagram illustrating an example of an access network 200 in an LTE network architecture, in which aspects of the present disclosure may be performed, for example, to manage communications in the wireless communication system using enhanced downlink control channel to reduce transmission time interval (TTI) for low latency communications using quick uplink channels.

In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include an uplink scheduling component 602 configured to expedite communication of control information and user data with the number of UEs 115 using an Quick LTE data structure, for example but not limited to the data structure provided in the downlink subframe structure 900 of FIG. 9, which may include a TTI of one slot for some RE blocks. Similarly, one or more of UEs 206 may include an uplink transmitter component 661 configured to transmit, decode and operate using the data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
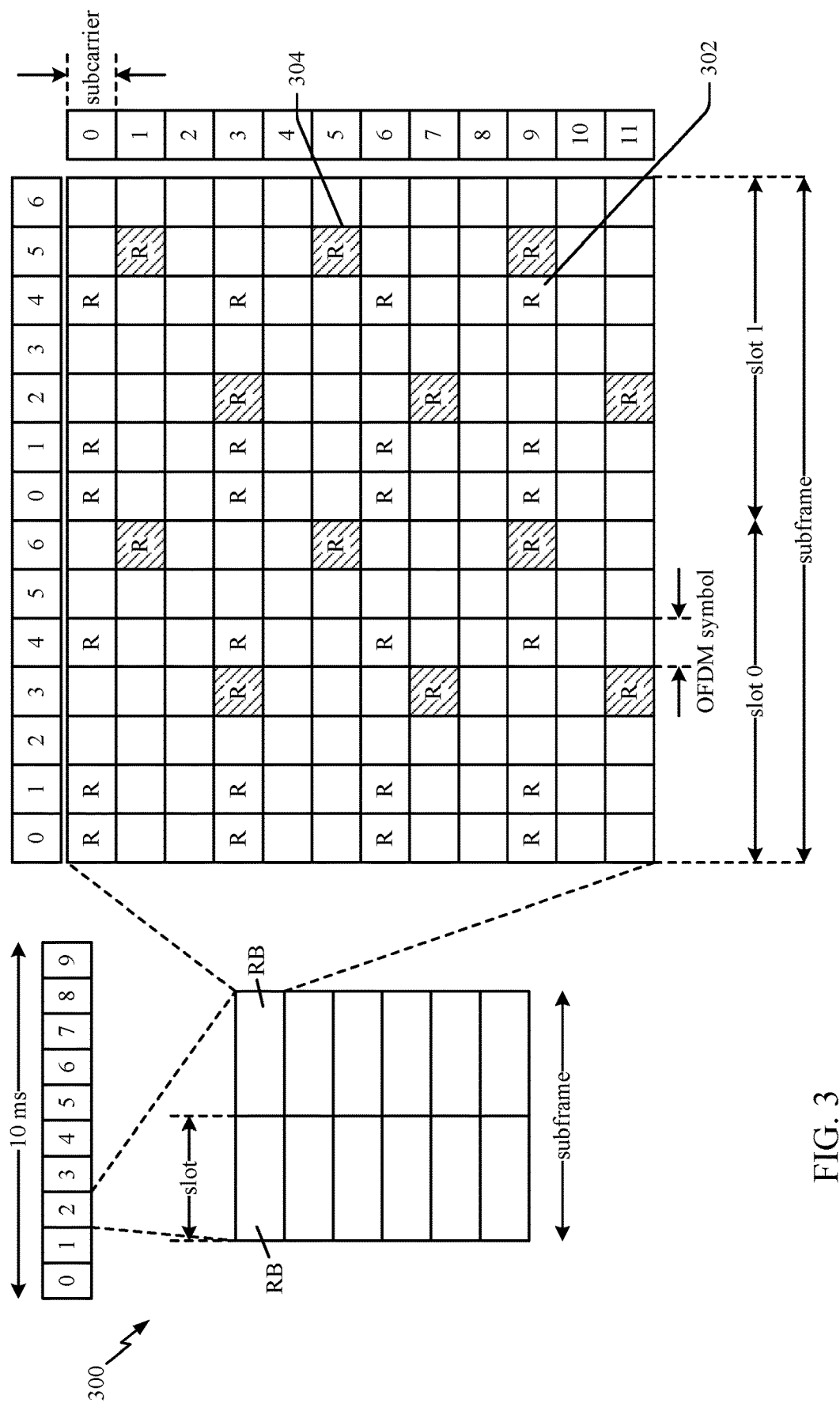
FIG. 3 is a diagram illustrating an example of a downlink (DL) frame structure in an access network, in accordance with an aspect of the present disclosure.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
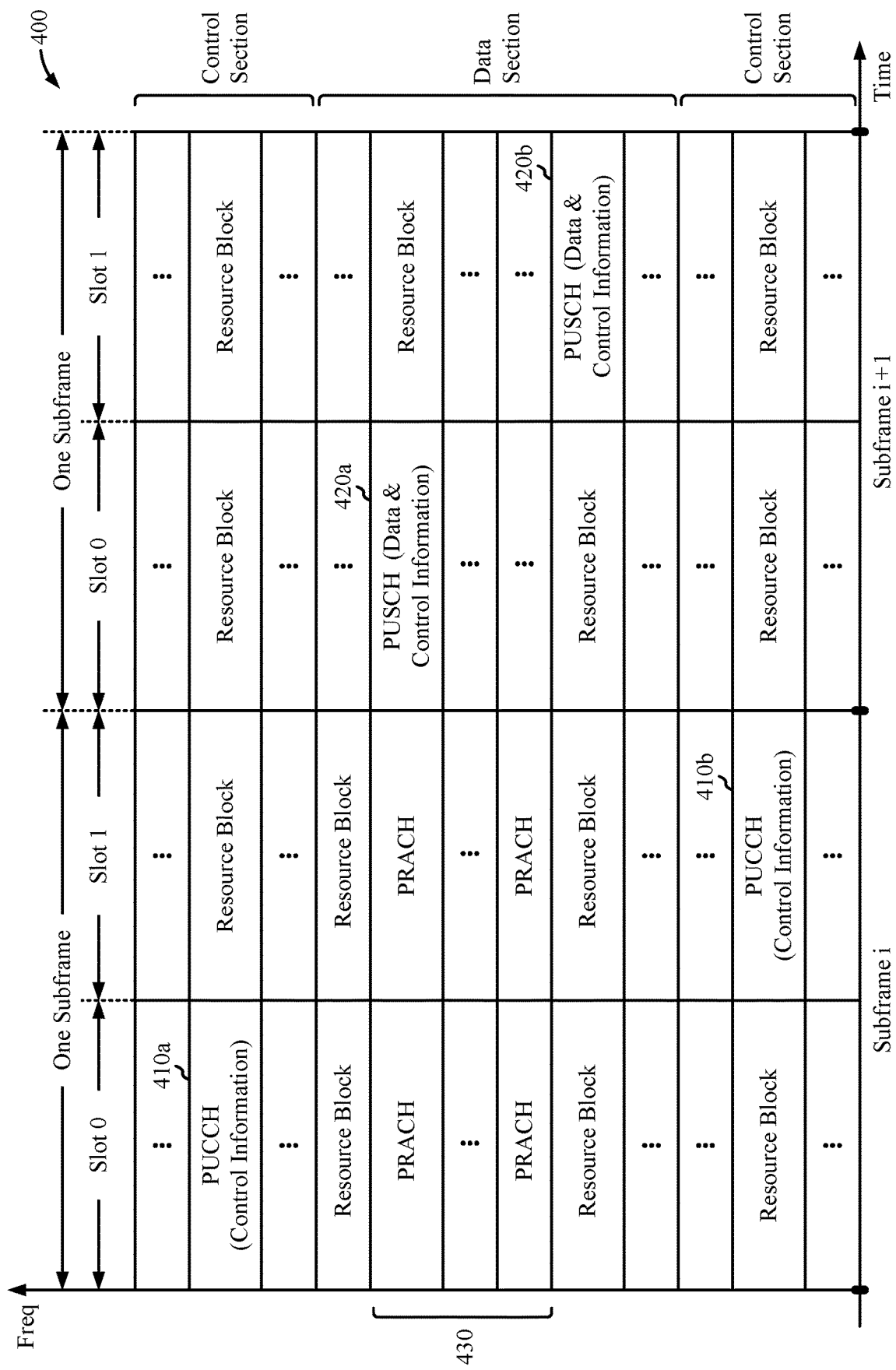
FIG. 4 is a diagram illustrating an example of an uplink (UL) frame structure in an access network, in accordance with an aspect of the present disclosure.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
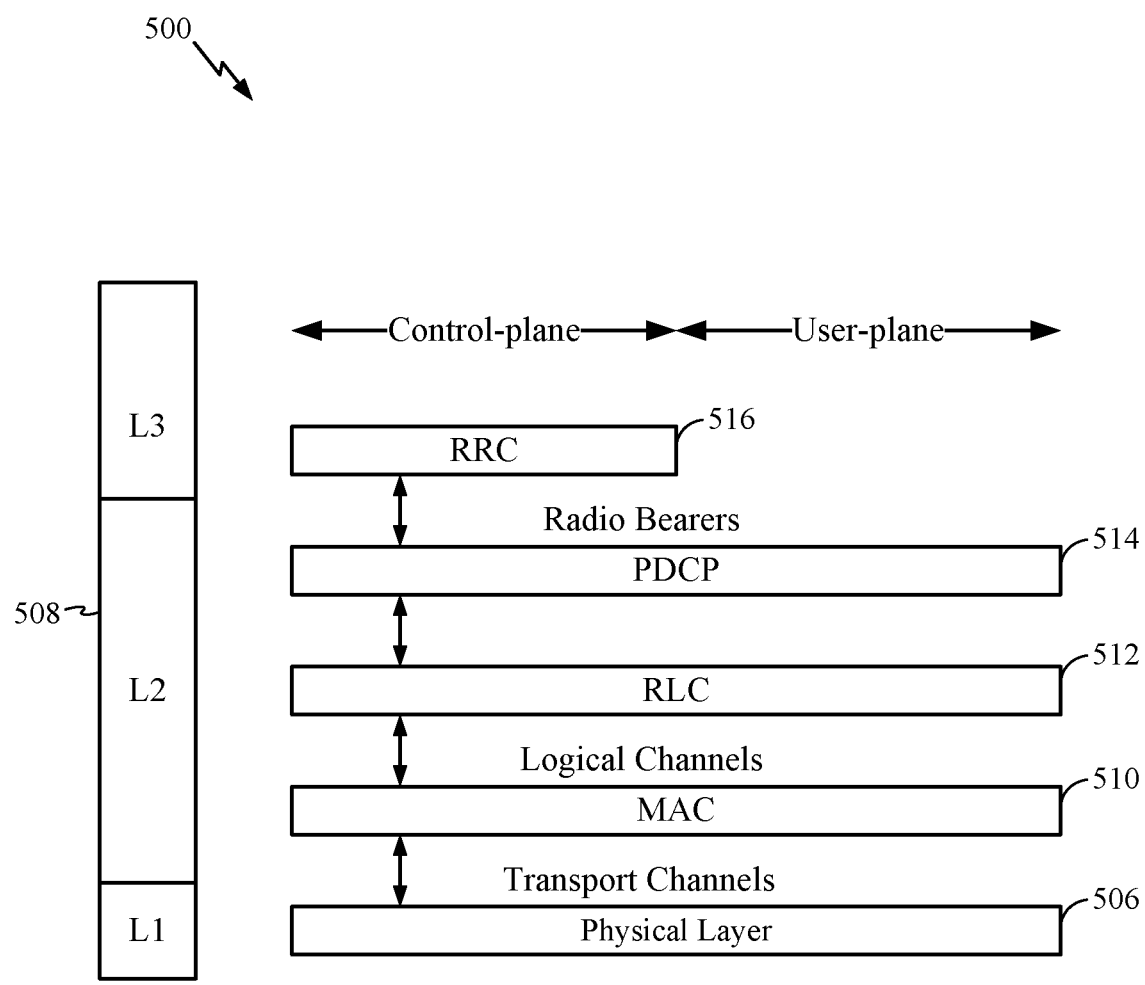
FIG. 5 is a diagram illustrating an example of a radio protocol architecture for the user and control planes, in accordance with an aspect of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
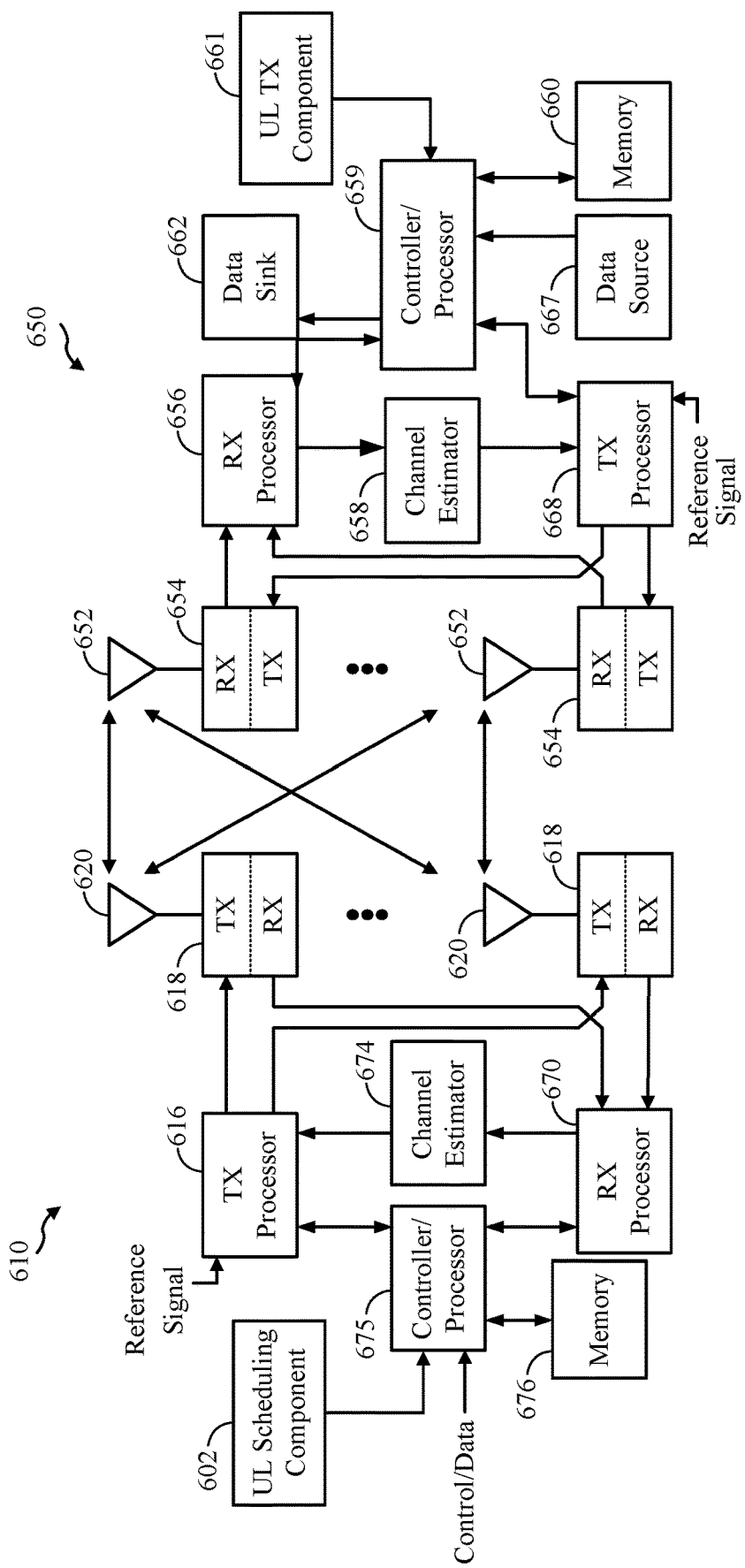
FIG. 6 is a diagram illustrating an example of a base station (BS) and user equipment (UE) in an access network, in accordance with an aspect of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an uplink scheduling component 602 configured to expedite communication of control information and user data with the number of UEs 115 according to certain aspects of the present disclosure.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include an uplink transmitter component 661 configured to receive, decode and operate using the data structure of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example New Radio (NR)/5G Radio Access Network (RAN) Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
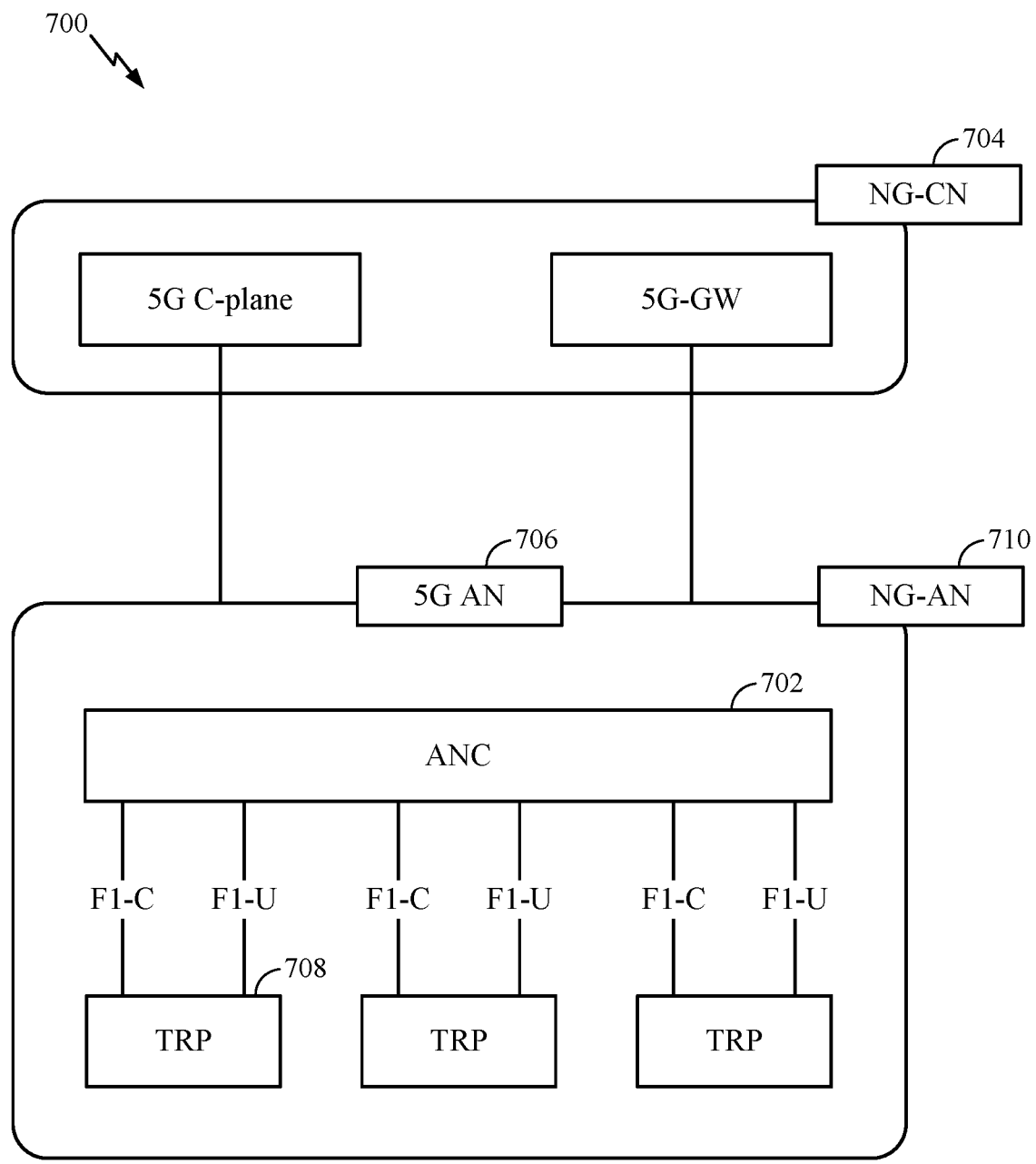
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

Figure 8:
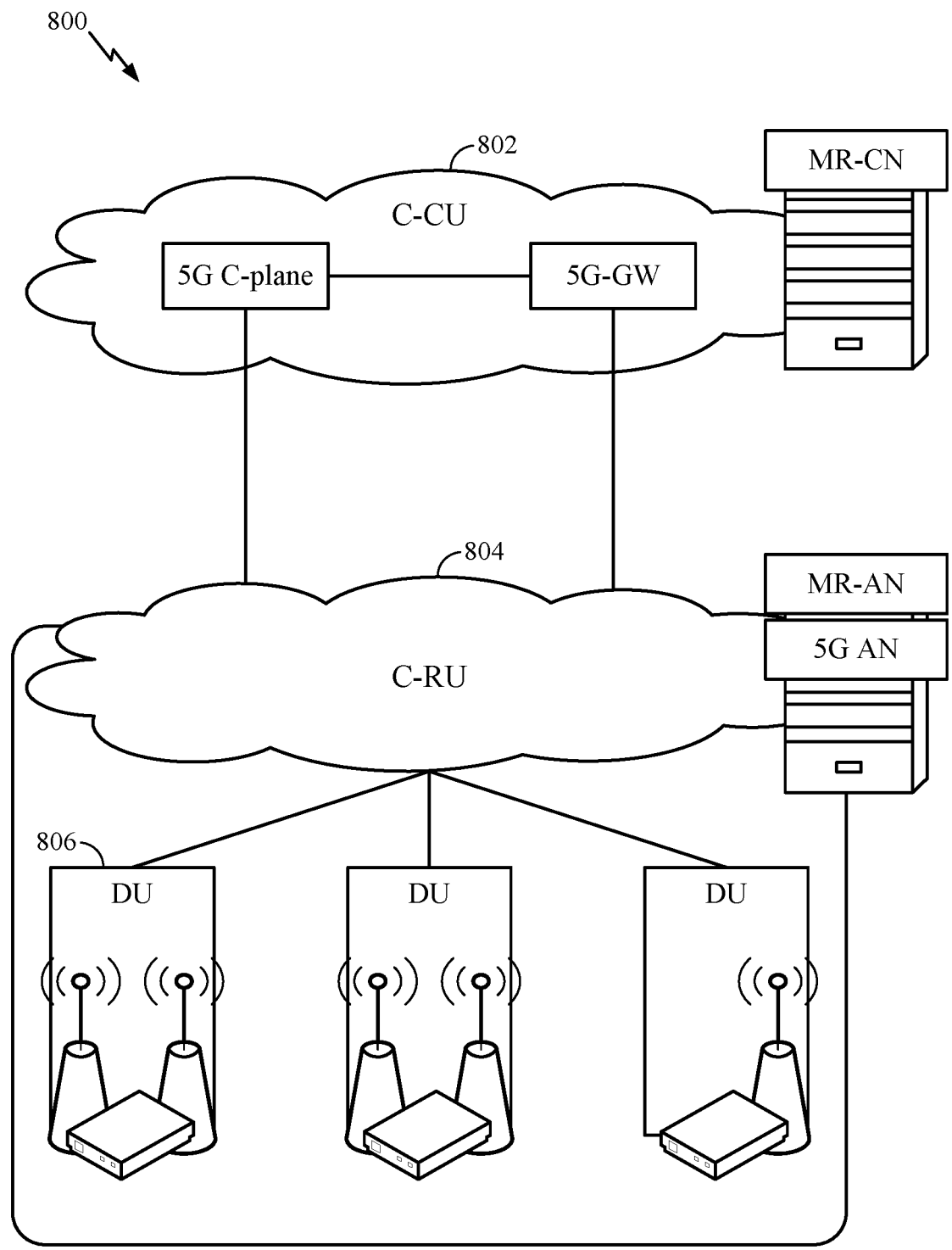
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 706 may host one or more TRPs. The DU may be located at edges of the network with radio frequency (RF) functionality.

Figure 9:
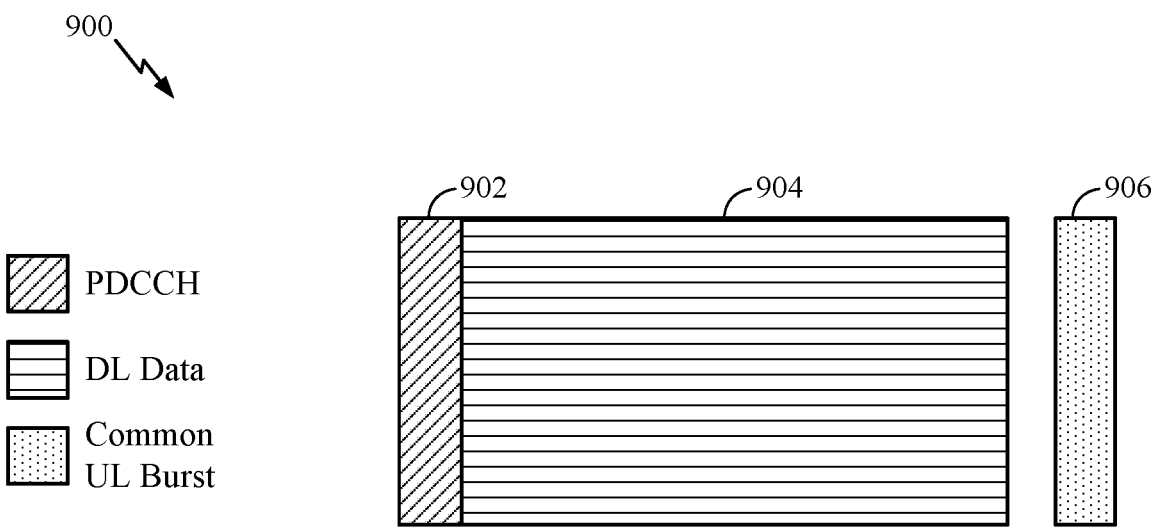
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
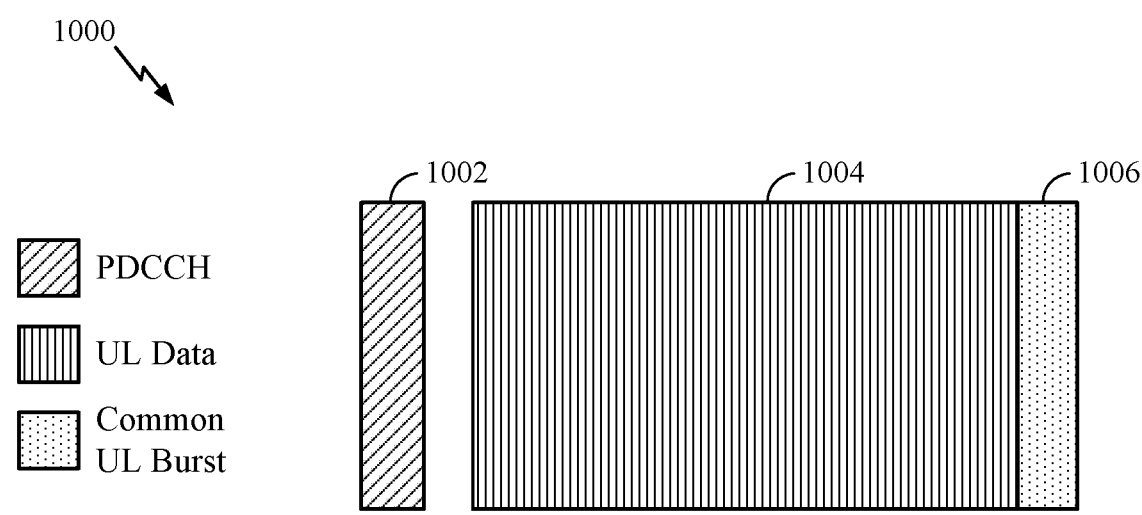
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Uplink Channel Design

Certain aspects of the present disclosure relate to uplink channel designs that may be used for uplink communications using a reduced duration transmission time interval (TTI) relative to a legacy uplink channel.

A user equipment (UE) may comprise, be implemented as, or be known as an access terminal (AT), a subscriber station, a subscriber unit, a mobile station, a remote station, a remote terminal, a remote device, a wireless device, a device, a user terminal, a user agent, a user device, a user station, machine type communications (MTC) device or some other terminology. Examples of UEs include cellular phones (e.g., smart phones), tablets, laptops, netbooks, smartbooks, ultrabooks, navigation devices, camera devices, gaming devices, etc. Examples of MTC devices include various wireless sensors, monitors, detectors, meters, or other type data monitoring, generating, or relaying devices that may be expected to operate (possibly unattended) for years on a single battery charge.

Legacy communications may be based on a 1 millisecond, or subframe-length, transmission time interval (TTI). Slot-based communications using a reduced length TTI, such as a 0.5 ms (or slot-length) TTI may be enabled to provide for reduced latency communications. Slot-based TTIs may use the same frame numerology as subframe-based TTIs and may be backward compatible with traffic transmitted using a subframe-based TTI. Additionally, communications using slot-based TTIs may use the broadcast, random access, handover, and other procedures used in legacy communications (e.g., communications based on a subframe-length TTI).

Control channels in a communications system in which subframe-based and slot-based TTIs are supported may be a legacy PDCCH (e.g., a PDCCH using a subframe-based TTI) or a slot-based ePDCCH. A physical hybrid-ARQ indicator channel (PHICH) in the legacy control regions may be used in uplink communications for both slots in a subframe. Resource allocation, transport block size, and other properties may be adjusted to allow for the coexistence of slot-based TTIs with subframe-based TTIs.

Figure 11:
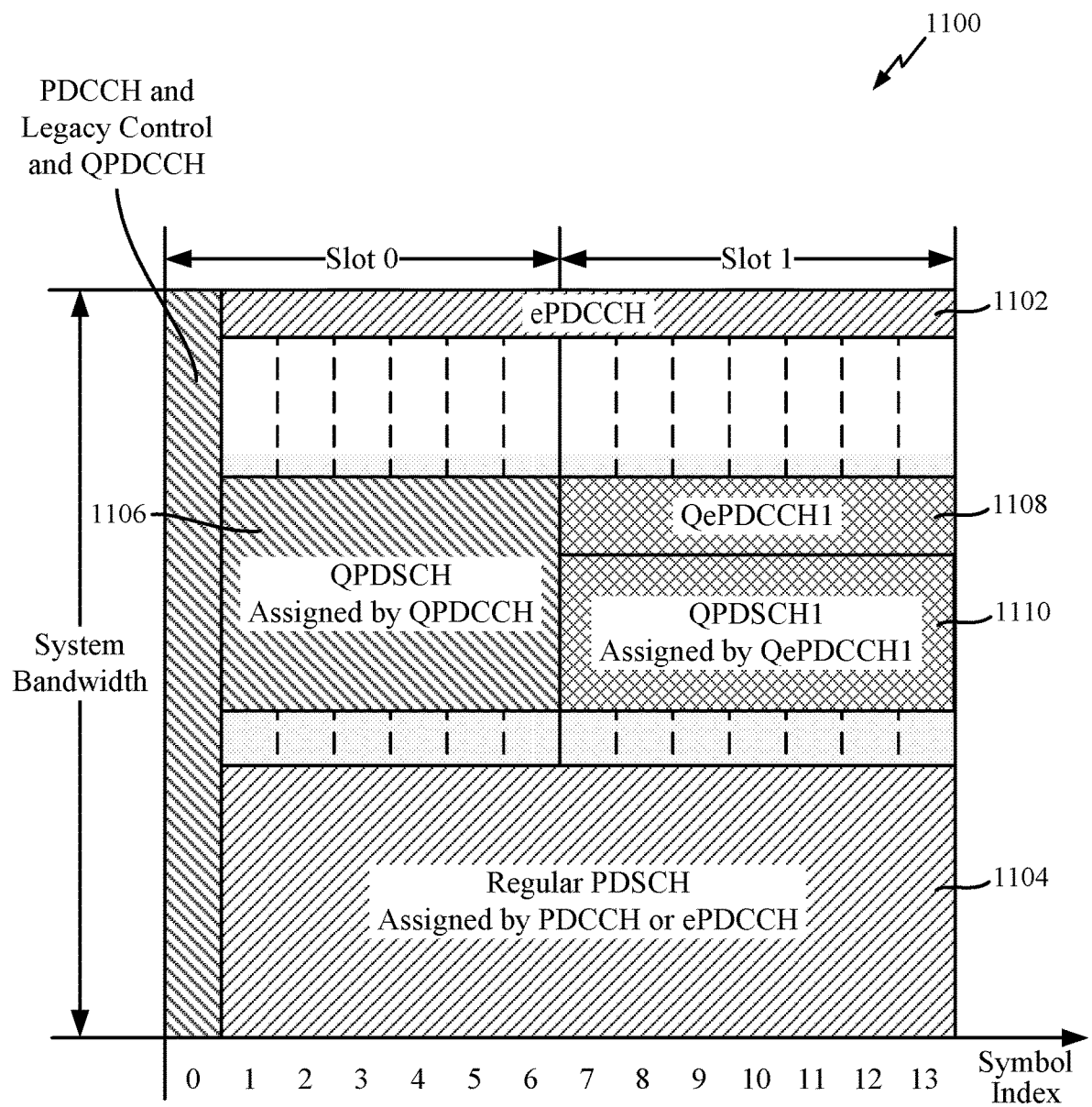
FIG. 11 is a diagram illustrating an arrangement of channels transmitted using legacy and slot-based TTIs, in accordance with an aspect of the present disclosure.

FIG. 11 illustrates an example subframe 1100 in which subframe-based and slot-based TTIs are used in transmitting data in a wireless communications system. As illustrated, PDCCH, legacy control, and a quick PDCCH (QPDCCH) may be transmitted from a node to a UE in symbol 0 using the entire system bandwidth for a given subframe. Legacy ePDCCH 1102 and PDSCH 1104 may be transmitted using a subframe-based TTI, with both the legacy ePDCCH 1102 and PDSCH 1104 channels transmitted in both slot 0 and slot 1 of the subframe 1100. The location of PDSCH 704 may be indicated by data carried in the PDCCH transmitted in symbol 0 or ePDCCH 702.

As illustrated, in slot 0, the location of a quick PDSCH (QPDSCH) 1106, which may be transmitted using a slot-based TTI, may be indicated in data carried by the QPDCCH transmitted in symbol 0. In slot 1, which represents a new TTI for channels transmitted using a slot-based TTI, a quick ePDCCH (QEPDCCH) 1108 may be transmitted in some frequency resources used by QPDSCH 1106 in slot 0 and may indicate the location of QPDSCH 1710 transmitted in slot 1.

The design of a quick uplink control channel (e.g., QPUCCH) may be based on a format used for transmitting uplink control data on the channel. For PUCCH formats 1, 1a, 1b, and 2, a legacy PUCCH and QPUCCH may use the same design. In some cases, two resource blocks may be used for frequency diversity. The use of two resource blocks may impact the peak-to-average power ratio (PAPR). If CQI is transmitted on PUCCH using formats 1, 1a, 1b, or 2, a subframe-based TTI may be used for delay tolerant data. Using a subframe-based TTI may not be preferred due to PUSCH multiplexing.

For PUCCH format 3, a legacy PUCCH and QPUCCH may also use the same design. In some cases, a QPDCCH may transmit data using a payload size reduced by half or using a doubled code rate relative to a legacy PDCCH. In some cases, the code rate used for a QPDCCH may remain the same as a legacy PDCCH, and QPDCCH may be transmitted using two resource blocks.

In some cases, PUCCH formats 2a and 2b may not be supported on QPUCCH. To avoid dropping transmission of CQI data, PUCCH format 3 may be used to transmit data on QPUCCH.

In some cases, PUCCH resources may be mapped to a downlink assignment. In a first slot, a legacy PUCCH may be mapped to the location of a QPDCCH or QPDSCH in the first slot, and in a second slot, the legacy PUCCH may be mapped to the location of a QPDCCH or QPDSCH in the second slot.

In some cases, QPUCCH may be located in the same frequency location as a legacy PUCCH. Different resource blocks may be used in slot 0 or in slot 1, and a low latency (LL) UE may use either slot 0 or slot 1, which may be interpreted as no frequency hopping from the perspective of the LL UE. In some cases, group hopping and sequence hopping may be supported, and an LL UE may follow the same group and/or sequence determination as a legacy UE.

In a design of the QPUSCH, one demodulation reference symbol (DMRS) may be supported in each slot. In some cases, a QPUSCH design may be modified to include two DMRS symbols. To include two DMRS symbols in a QPUSCH, the structure of PUCCH format 2 may be reused. In some cases, a shortened pilot may be reused, with two pilots per subframe and two cyclic prefixes (CPs) with known pre-discrete Fourier transform (DFT) half data tones as a pilot. In some cases, single carrier frequency division multiplexing (SC-FDM) may be used with some known post-DFT symbols used as a pilot. The QPUSCH may be data rate matched within each slot, and frequency hopping may not be supported across slots.

In some cases, sounding reference symbols may be transmitted only in slot 1. Doing so may provide for a backward compatible design with other UEs (e.g. legacy UEs) in the same subframe. In some cases, to minimize overhead, SRS may not be transmitted in both slot 0 and slot 1. In some cases, SRS may be transmitted in both slot 0 and slot 1.

In some cases, the same mapping and dropping rules used for legacy PUSCH may be used for transmitting uplink control information (UCI) on QPUSCH. Slot based resource mapping may be used when UCI is transmitted with QPUSCH. In some cases, the same number of resources may be kept if the QPUSCH assignment doubles with a single slot assignment. In some cases, a new parameter may be used for ACK, rank indicator (RI), and CQI resource determination if the code rate changes for QPUSCH due to a single slot assignment.

In some cases, CQI may be multiplexed with a slot-based PUSCH. In some cases, when a single slot PUSCH is transmitted, CQI may be transmitted in a slot. A scheduling request configuration may additionally be slot-based.

Figure 12:
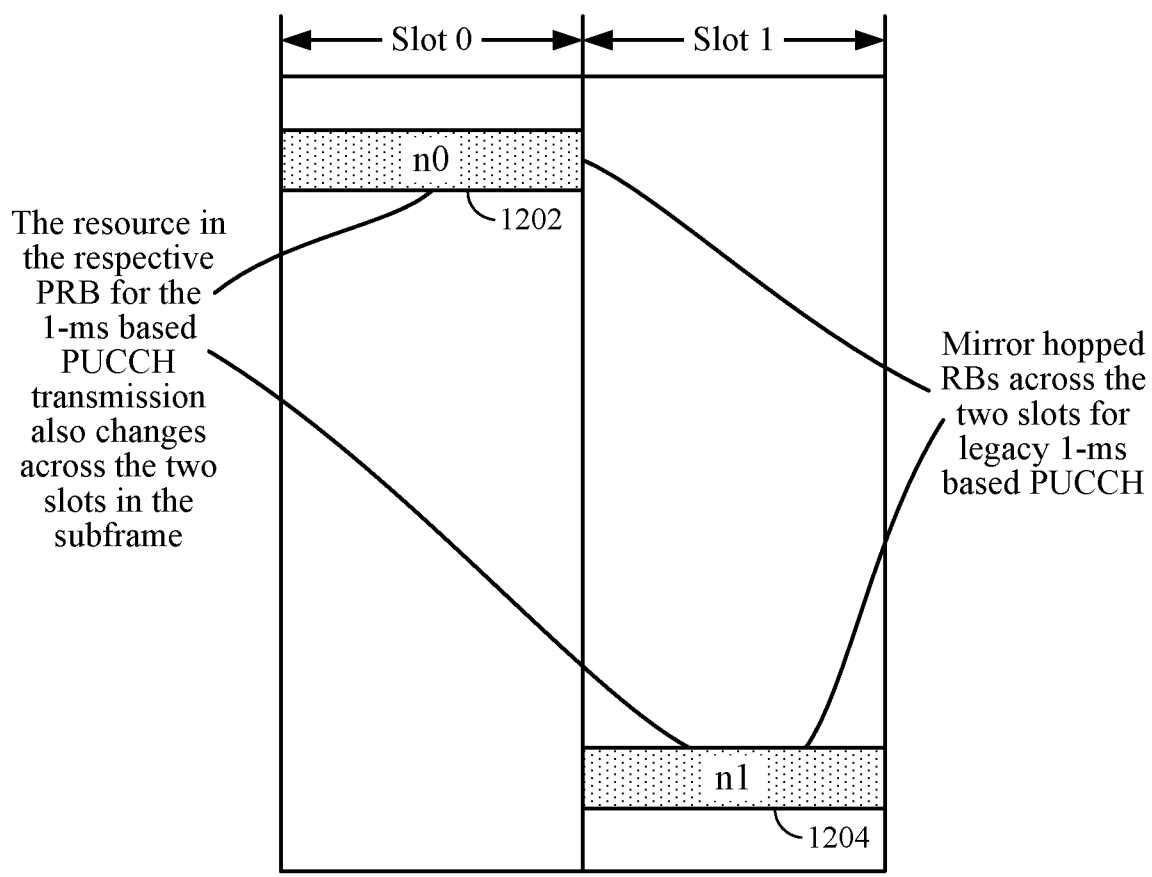
FIG. 12 is a diagram illustrating an example legacy physical uplink control channel (PUCCH) transmission, in accordance with an aspect of the present disclosure.

FIG. 12 illustrates an example of a legacy PUCCH transmission 1200, according to an aspect of the present disclosure. A legacy PUCCH resource can be grouped into two parts: a physical resource block (PRB) resource and a resource with the determined PRB. A legacy PUCCH (e.g., using a subframe-based TTI) may have a first PRB 1202 in a first slot of the subframe and a second PRB 1204 in a second slot of the subframe. The second PRB 1204 may be mirror hopped from the first PRB 1202. Identifying a location of the legacy PUCCH in the second slot may entail calculating the location from a location of the legacy PUCCH in the first slot. For example, the second PRB index may be calculated from as the difference between the number of PRBs used on the uplink and the first PRB index, plus 1.

The resource with the determined PRB may have different details based on a PUCCH format. The resource within the first PRB 1202 may be different from the resource in the second PRB 1204. By using a different resource, inter-user interference of the same RB within the cell and inter-cell interference may be randomized. In one example, for PUCCH format 1, the resource may be defined in terms of a cyclic shift and a spreading code. The resource for slot 0 may be derived based on a dynamic index (e.g., based on the starting control channel element (CCE) or enhanced CCE (ECCE)) and an RRC configuration. The resource for slot 1 may be determined based on a formula and the resource used in slot 0.

In another example, resource variation for PUCCH format 2 may use a cyclic shift value, $n_0$, in slot 0 based on an RRC configuration. The cyclic shift value in slot 1, $n_1$, may be determined implicitly based on $n_0$. For example, $n_1$ may be calculated according to the formula: $n_1 = \mod(12*(n_0+1), 13)-1$.

The resource derivation for some PUCCH formats may include a dynamic component and a semi-static component, while the resource derivation for other PUCCH formats may include only a semi-static component. In PUCCH format 1a, the dynamic component may be the starting CCE or ECCE of the corresponding control channel, while the semi-static component may be a cell-specific or UE-specific starting resource offset. In PUCCH format 2, the semi-static component may include a resource index (but may not include a dynamic component). In PUCCH format 3, the dynamic component may be a 2-bit ACK/NACK resource indicator (ARI), which selects from one of four semi-statically configured resources.

Figure 13:
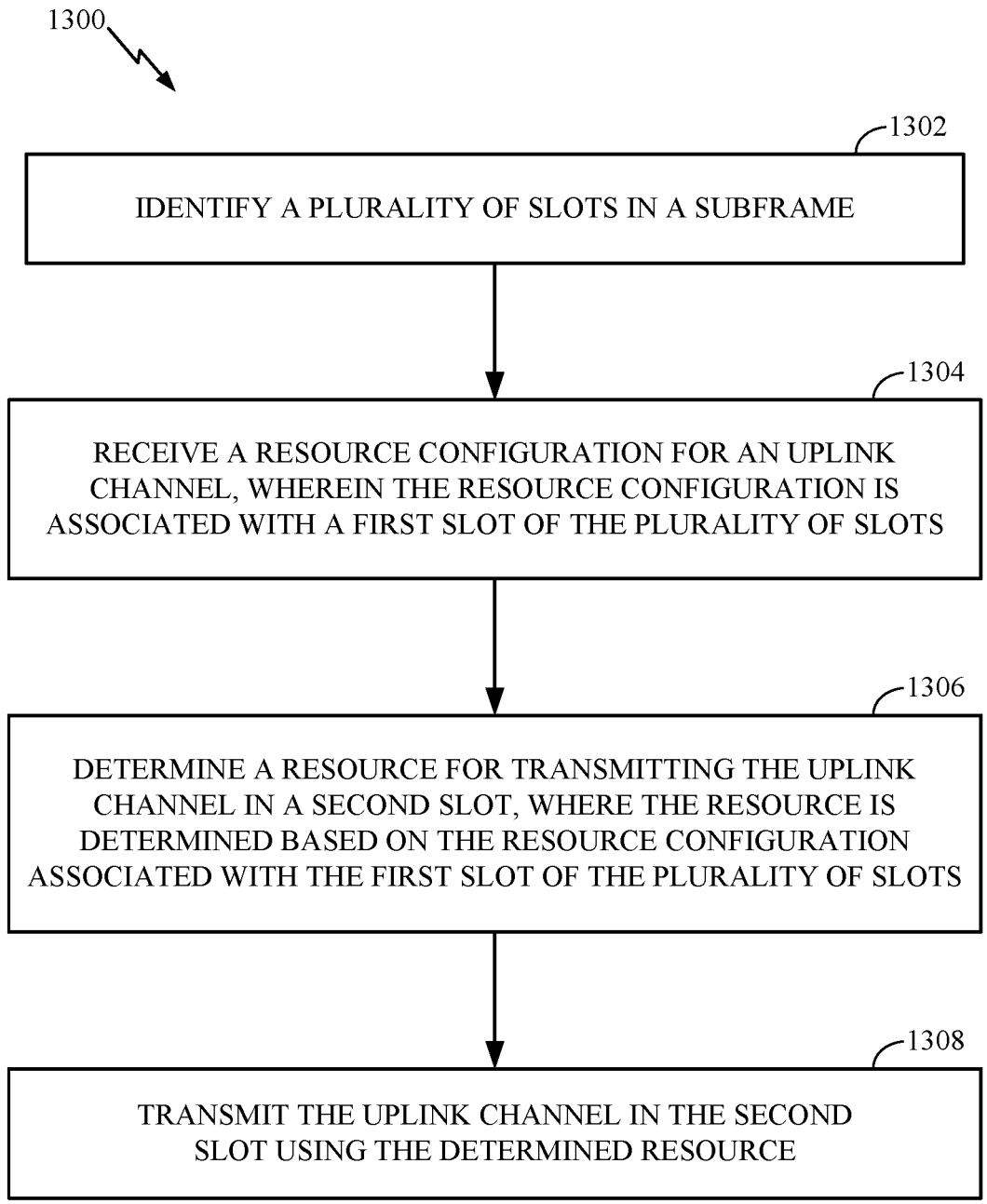
FIG. 13 illustrates example operations that may be performed by a user equipment (UE) to transmit an uplink channel, in accordance with an aspect of the present disclosure.

FIG. 13 illustrates example operations 1300 that may be performed to determine resources to use for transmitting an uplink channel, according to an aspect of the present disclosure. As illustrated, operations 1300 begin at 1302, where a UE identifies a plurality of slots in a subframe. At 1304, the UE receives a resource configuration associated with a first slot of the plurality of slots, and at 1306, the UE determines a resource for transmitting the uplink channel in a second slot. The resource may be determined based on the resource configuration associated with the first slot of the plurality of slots. At 1308, the UE transmits the uplink channel in the second slot using the determined resource.

For QPUCCH using a slot-based TTI, a single set of RRC configurations may be configured for a UE for a first slot of a subframe (e.g., slot 0). The semi-static components for the other slot of the subframe (e.g., slot 1) may be implicitly derived from the first slot. In one example, the starting resource offset for QPUCCH format 1 may be configured for slot 0, and the starting resource offset for QPUCCH in slot 1 may be mapped to a mirrored location relative to the starting resource offset for QPUCCH in slot 0. The same starting resource offset originally defined for a legacy PUCCH may be reused for QPUCCH. In some cases, a separate starting offset may be configured for QPUCCH.

In another example, one resource for QPUCCH can use a structure similar to PUCCH format 2. The resource may refer to slot 0, and for slot 1, the corresponding resource may be implicitly derived. The derivation of the resource for QPUCCH in slot 1 may be based on the formula defined for legacy PUCCH format 2.

In another example, up to four resources can be defined for QPUCCH using a structure similar to PUCCH format 3. The four resources may refer to slot 0, and for slot 1, the corresponding resource may be implicitly derived. The derivation may be based, for example, on the formula defined for legacy PUCCH format 3.

In some cases, the dynamic component may be derived on a per-slot basis for QPUCCH. For example, the usage of a starting CCE or ECCE or the usage of an acknowledgment/negative acknowledgment resource indicator (ARI) may be performed on a per-slot basis.

In some cases, implicit slot hopping (e.g., mirrored hopping) may not be supported for QPUCCH. In such a case, the two slot-based QPUCCH may be located in the same frequency location (e.g., a PRB location). The two slot-based QPUCCH may use different resources within the respective PRBs. By locating the two slot-based QPUCCH in the same frequency location, enhanced channel estimation may be enabled. Additionally, maintaining the same frequency location for the two slot-based QPUCCH in a subframe may provide for easier coexistence with PUSCH, which may be scheduled without slot-level hopping.

In some cases, offset-based implicit hopping may be used for QPUCCH. In offset-based implicit hopping, the location of QPUCCH in slot 0 may hop from the location of QPUCCH in slot 1 based on an offset. Offset-based implicit hopping may mimic offset-based hopping used for legacy PUSCH. For example, the offset value may be based on a system bandwidth and may have one or more values.

In some cases, multiple resource manage modes may be used for QPUCCH. As an example in a first mode, implicit mirror hopping may be used. In a second mode, PRB hopping across slots may be disallowed, though resource hopping within the PRB may or may not be supported across the two slots in a subframe. A UE may be configured (e.g., via RRC signaling) to operate QPUCCH using one of the two modes described above.

Legacy uplink channel (PUCCH or PUSCH) power control generally includes an open loop power control part and a closed loop power control part. The open loop power control part generally includes cell-specific and UE-specific power control parameters, and the closed loop power part (denoted as g(i) for PUCCH and f(i) for PUSCH) can be updated based on dynamic power control commands.

Figure 14:
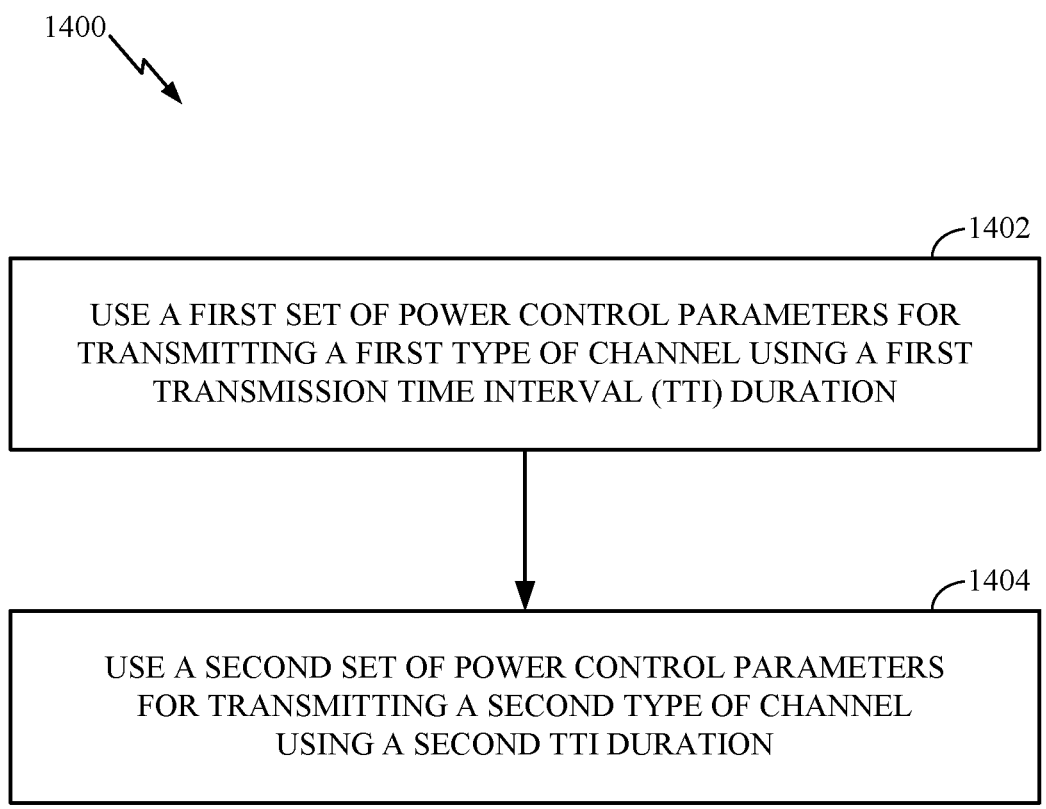
FIG. 14 illustrates example operations that may be performed by a user equipment (UE) to transmit on different types of uplink channels using power control parameters for each type of uplink channel, in accordance with an aspect of the present disclosure.

FIG. 14 illustrates example operations 1400 for performing power control for uplink control channels, according to an aspect of the present disclosure. As illustrated, operations 1400 begin at 1402, where a UE uses a first set of power control parameters for transmitting a first type of channel using a first transmission time interval (TTI) duration. At 1404, the UE uses a second set of power control parameters for transmitting a second type of channel using a second TTI duration.

In some cases, the same closed loop power control may be used for a legacy channel and a quick channel, or a channel associated with a reduced TTI duration relative to the legacy channel. Different sets of open loop power control parameters may be used for the legacy channel and the quick channel. For example, a power difference between a legacy channel associated with a subframe-based TTI (e.g., legacy PUCCH or PUSCH) and a channel associated with a slot-based TTI (e.g., a QPUCCH or QPUSCH) may be realized with an offset (e.g., approximately 4 dB) defined using an explicit parameter or embedded within the open loop power control configurations.

In some cases, a legacy channel associated with a subframe-based TTI (e.g., legacy PUCCH or PUSCH) and a channel associated with a slot-based TTI (e.g., a QPUCCH or QPUSCH) may use separate closed loop power control parameters (e.g., different g(i) for PUCCH and QPUCCH, or different f(i) for PUSCH and QPUSCH). In some cases, the legacy channel and the channel associated with a slot-based TTI may use different open loop configurations. The legacy channel and the channel associated with a slot-based TTI may reuse the open loop power control configuration associated with the legacy channel. In such a case, QPUCCH may be treated as a new PUCCH format, and a PUCCH format dependent adjustment may be defined for the QPUCCH.

Using the same closed loop power control configuration may simplify power control command management, as using different closed loop power control configurations may not be necessary.

For PUSCH, a UE may be configured with two subframe sets. Each subframe set may be associated with a closed-loop function. The two subframe sets may be applicable to both QPUSCH and PUSCH, or only to one of them.

In some cases, transmission power control (TPC) commands may be received via slot-TTI grants. The application of these TPC commands may be applied at the subframe boundary or the slot boundary. In some cases, because the transmission power for a 1 millisecond (i.e., subframe-based) TTI may be fixed, TPC may be applied for slot 1 if there is not an ongoing 1 ms transmission.

When uplink control information (UCI) is carried on PUSCH, a higher configured parameter, which may be named beta_offset, may be used to control the amount of resources allocated to UCI. The offset configuration may be based on a UCI type (ACK/NAK, SR, RI, CQI, and so on), PUSCH parameters (single-in-multiple-out (SIMO) or multiple-in-multiple-out (MIMO)), whether a cyclic redundancy check (CRC) is used for UCI, and so on. For UCI carried on QPUSCH (a channel associated with a slot-length TTI), beta_offset may be configured separately from the beta_offset configured for PUSCH (a channel associated with a 1 ms TTI). When a UE performs an uplink data transmission with UCI, the UE may select one beta_offset to use based on the TTI of the uplink data transmission. That is, the beta_offset configured for PUSCH may be selected for a 1 ms TTI, while the beta_offset configured for QPUSCH may be selected for a slot-bated (0.5 ms) TTI.

Figure 15:
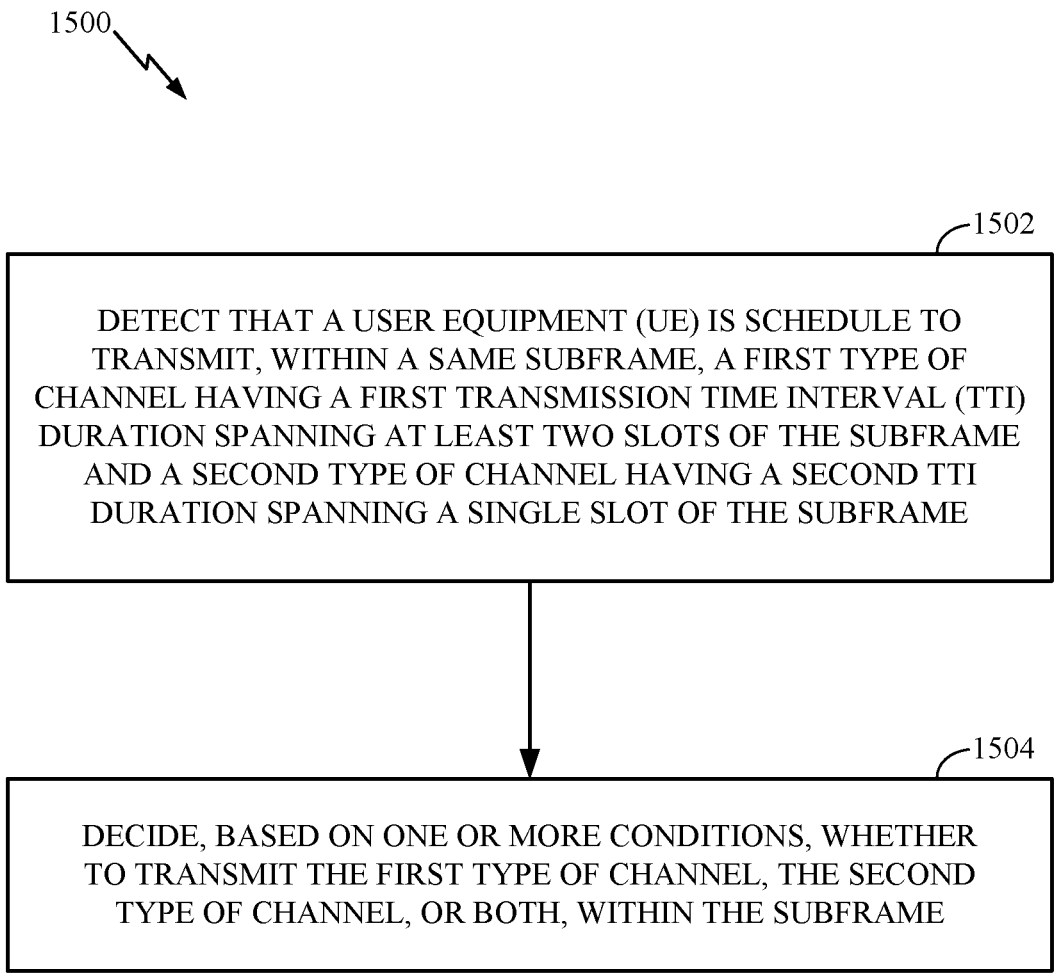
FIG. 15 illustrates example operations that may be performed by a user equipment (UE) to determine a uplink channel to transmit in a subframe, in accordance with an aspect of the present disclosure.

FIG. 15 illustrates example operations 1500 that may be performed to support 1 ms and 1 slot channels in the same subframe, according to an aspect of the present disclosure. Operations 1500 generally begin at 1502, where the UE detects that the UE is scheduled to transmit, within a same subframe a first type of channel having a first TTI duration spanning at least two slots of the subframe and a second type of channel having a TTI duration spanning a single slot of the subframe. At 1504, the UE decides, based on one or more conditions, whether to transmit the first type of control channel, the second type of control channel, or both, within the subframe.

Figure 16:
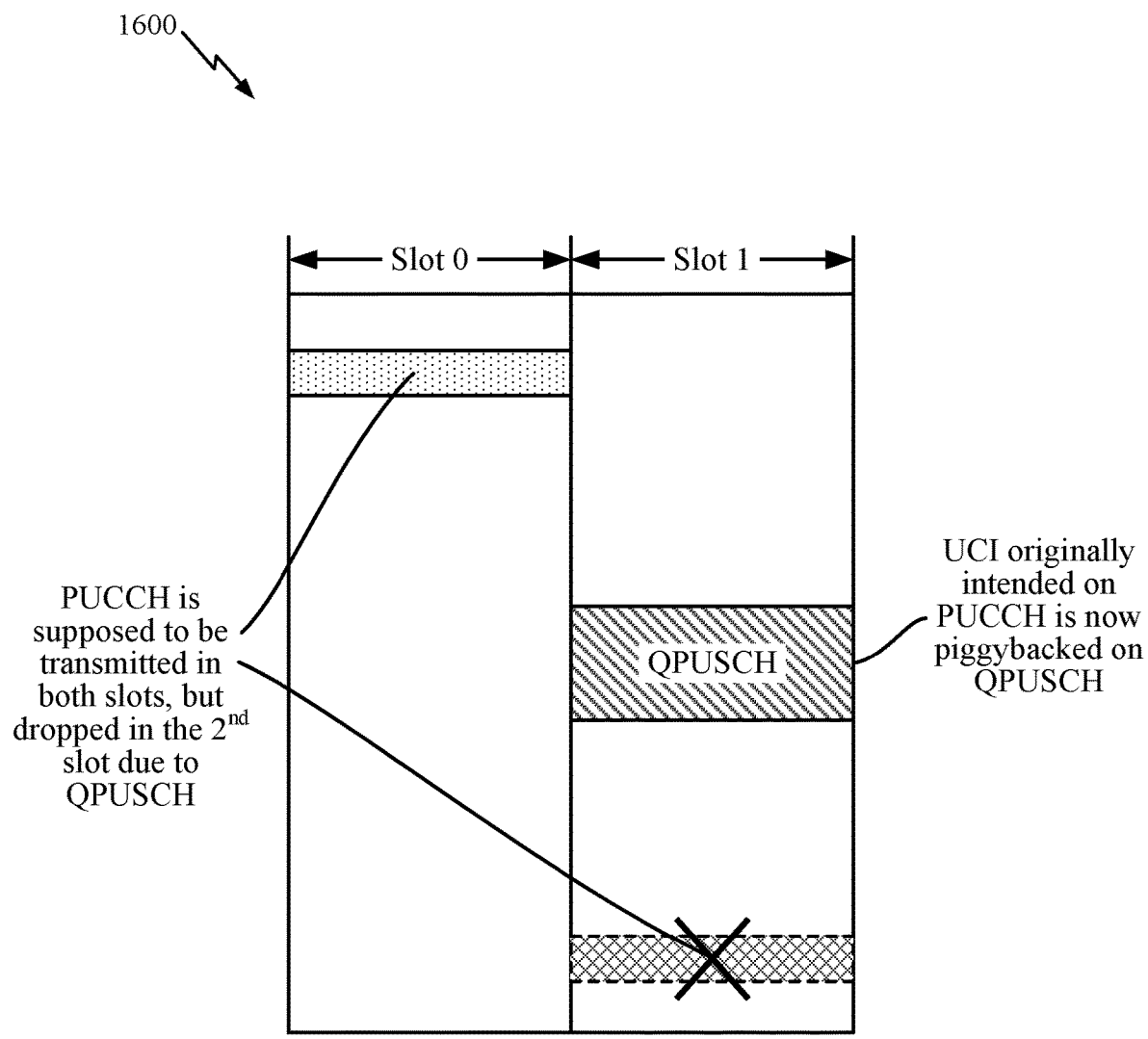
FIG. 16 illustrates an example of slot-dependent uplink channel transmission, in accordance with an aspect of the present disclosure.

In some cases, transmission of PUCCH and QPUSCH may be supported in the same subframe by a UE. In this example, the control channel may be based on a 1 ms PUCCH, and the data channel may be based on a 1-slot QPUSCH. When the 1 ms PUCCH and 1-slot QPUSCH are due in the same subframe for a UE, a UE may decide to transmit the channels in parallel or transmit a single channel in each slot of the subframe. For example, in slot-dependent parallel transmission, PUCCH may be transmitted in slot 0, and both PUCCH and QPUSCH may be transmitted in slot 1. In single channel transmission 1600, as illustrated in FIG. 16, PUCCH may be transmitted in slot 0, and QPUSCH may be transmitted in slot 1. UCI originally scheduled to be carried on PUCCH may be piggybacked on QPUSCH. In some cases, the UCI carried on QPUSCH may contain information for both slots in PUCCH or the slot for which PUCCH is dropped to transmit QPUSCH with UCI. In some cases, QPUSCH may carry partial UCI information. For example, CSI may be dropped from the UCI, and ACK/NACK may be piggybacked on QPUSCH. Both parallel and single channel transmission may be supported, and a UE may be configured to use parallel or single channel transmission for a particular subframe.

A UE may be configured semi-statically to use PUCCH or QPUCCH. In some cases, a UE may be configured to transmit a 1 ms-based CQI and a 0.5 ms (slot-based) ACK/NAK, which may result in transmission of a 1 ms PUCCH and a 0.5 ms PUCCH. If there is an ongoing legacy PUCCH format 2 transmission, the 0.5 ms ACK/NAK may be used to modulate the pilot symbols of PUCCH format 2 on a per-slot basis. For example, an ACK/NAK in slot 0 may generate a first symbol modulating pilot symbols of PUCCH format 2, and an ACK/NAK in slot 1 may generate a second symbol modulating pilot symbols for PUCCH format 2.

In some cases, PUSCH and QPUSCH may be dynamically scheduled for a UE. The dynamic scheduling may be performed, for example, using information fields in a DCI message or by using different downlink control messages.

In some cases, QPUSCH may follow asynchronous hybrid automatic repeat request (HARQ), and PUSCH may follow synchronous HARQ. In such a case, QPUSCH and PUSCH may not share a same HARQ process. In some cases, QPUSCH and PUSCH may both use synchronous HARQ. It may be possible to share a HARQ process between PUSCH and QPUSCH. For example, a PUSCH HARQ process may be transmitted using QPUSCH in one slot of a corresponding subframe. It may be difficult to reuse PUSCH for retransmission of a packet initiated by QPUSCH. However, in some cases, the PUSCH in a subframe may be used for retransmissions of both QPUSCH slots of the HARQ process corresponding to the same subframe.

In some cases, a subset of HARQ processes for QPUSCH may be linked with HARQ processes for PUSCH for HARQ process sharing. For example, 8 uplink HARQ processes may be established for PUSCH and 16 uplink HARQ processes may be established for QPUSCH. HARQ process sharing may be defined for PUSCH and QPUSCH using the first 8 processes for QPUSCH, and process sharing may not be defined for HARQ processes 9-16 for QPUSCH.

In some cases, both PUSCH and QPUSCH may be configured for asynchronous HARQ. For example, if a UE is configured for asynchronous HARQ on QPUSCH, PUSCH may also be implicitly configured with asynchronous HARQ operation. By configuring both PUSCH and QPUSCH for asynchronous HARQ, HARQ process sharing between PUSCH and QPUSCH may be enabled.

Figure 17:
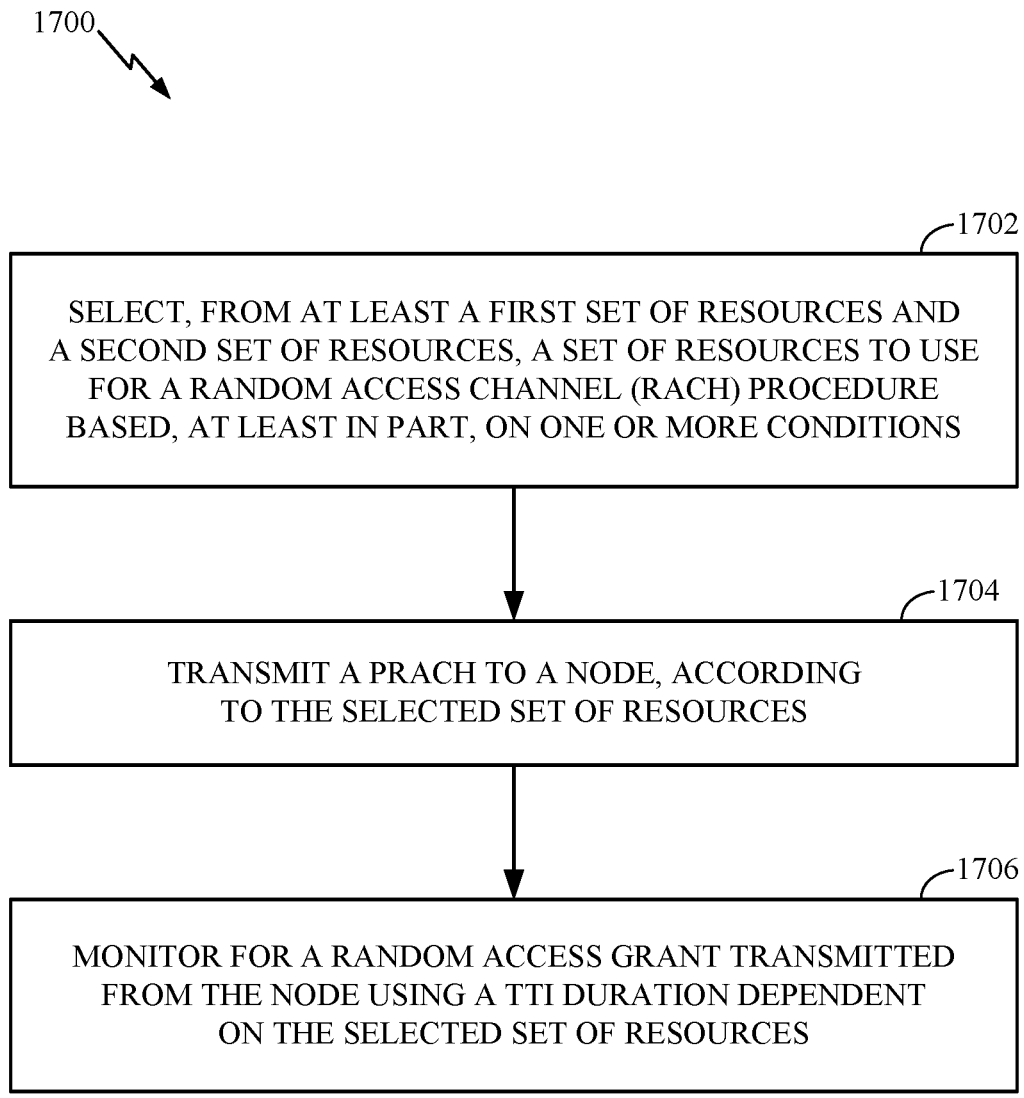
FIG. 17 illustrates example operations that may be performed by a user equipment (UE) to monitor for a random access grant associated with a TTI duration based on resources used to transmit a physical random access channel (PRACH), in accordance with an aspect of the present disclosure.

FIG. 17 illustrates example operations 1700 that may be performed by a UE to monitor for a random access grant associated with different TTI durations, according to an aspect of the present disclosure. As illustrated, operations 1700 begin at 1702, where a UE selects, from at least a first set of resources and a second set of resources, a set of resources to use for a random access channel (RACH) procedure based, at least in part on one or more conditions. At 1704, the UE transmits a PRACH to a node, according to the selected set of resources. At 1706, the UE monitors for a random access grant transmitted from the node using a TTI duration dependent on the selected set of resources.

In some cases, multiple sets of PRACH resources may be specified, and each set of PRACH resources may be linked with a respective PRACH procedure and a TTI duration. For example, a first set of PRACH resources may be linked with a 1 ms TTI, and a second set of PRACH resources may be linked with a 1-slot (0.5 ms) TTI. If a UE transmits a PRACH based on the first set of resources, the UE monitors for a random access grant using a 1 ms TTI length along with other parameters (e.g., a size of a response window) and, in some cases, subsequent procedures (e.g., a TTI of an initial uplink data transmission). Likewise, if a UE transmits a PRACH based on a second set of resources, the UE monitors for a random access grant using a 1-slot (0.5 ms) TTI length along with other parameters (e.g., a size of a response window) and, in some cases, subsequent procedures (e.g., a TTI of an initial uplink data transmission). A UE may determine which of the sets of PRACH resources to use based on UE capabilities, traffic needs, cell loading, and other conditions.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures (e.g., FIGS. 13, 14, 15, and/or 17), those operations may be performed by any suitable corresponding counterpart means plus function components. For example, means for providing, means for receiving, means for transmitting/retransmitting, means for performing, means for demodulating, means for allocating, means for determining, means for participating, and/or means for scheduling may comprise one or more transmitters/receivers (e.g., TX/RX 618 and/or RX/TX 654) and/or one or more processors (e.g., TX Processor 616/618, RX Processor 670/656, and/or Controller/Processor 675/658).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, PCM (phase change memory), ROM memory, EPROM memory, EEPROM memory, registers, hard disk, a removable disk, a CD ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c, and any combination of any number of a, b, or c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:

using a first set of power control parameters for transmitting a first type of channel using a first transmission time interval (TTI) duration;

using a second set of power control parameters for transmitting a second type of channel using a second TTI duration;

detecting that the UE is scheduled to transmit, within a same subframe, the first type of channel having the first transmission time interval (TTI) duration spanning at least two slots of the subframe and the second type of channel having the second transmission time interval (TTI) duration spanning a single slot of the subframe; and deciding, based on one or more conditions, whether to transmit the first type of channel, the second type of channel, or both, within the subframe.

2. The method of claim 1, wherein the first set of power control parameters and second set of power control parameters implement the same closed loop power control parameters.

3. The method of claim 2, wherein the first set of power control parameters includes a first set of open loop power control parameters and the second set of power control parameters includes a second set of open loop power control parameters.

4. The method of claim 1, wherein the first set of power control parameters include a first set of closed loop power control parameters and the second set of power control parameters include a second set of closed loop power control parameters.

5. The method of claim 4, wherein an open loop power control parameter associated with the second set of power control parameters comprises an adjustment from an open loop power control parameter associated with the first set of power control parameters.

6. The method of claim 1, wherein the first type of channel comprises a physical uplink control channel (PUCCH) and the second type of channel comprises a quick physical uplink shared channel (QPUSCH).

7. The method of claim 6, wherein the first type of channel is transmitted in a first slot of the subframe and the first and second types of channels are transmitted in a second slot of the subframe.

8. The method of claim 6, wherein the first type of channel is transmitted in a first slot of the subframe, and the second type of channel, but not the first type of channel, is transmitted in a second slot of the subframe.

9. The method of claim 8, wherein the second type of channel includes uplink control information (UCI) originally intended to be transmitted on the first type of channel.

10. The method of claim 9, wherein at least part of the UCI is dropped.

11. An apparatus, comprising:
a processor configured to:
use a first set of power control parameters for transmitting a first type of channel using a first transmission time interval (TTI) duration,
use a second set of power control parameters for transmitting a second type of channel using a second TTI duration,
detect that the UE is scheduled to transmit, within a same subframe, the first type of channel having the first transmission time interval (TTI) duration spanning at least two slots of the subframe and the second type of channel having the second transmission time interval (TTI) duration spanning a single slot of the subframe, and
decide, based on one or more conditions, whether to transmit the first type of channel, the second type of channel, or both, within the subframe; and
a memory coupled to the processor.

12. The apparatus of claim 11, wherein the first set of power control parameters and second set of power control parameters implement the same closed loop power control parameters.

13. The apparatus of claim 12, wherein the first set of power control parameters includes a first set of open loop power control parameters and the second set of power control parameters includes a second set of open loop power control parameters.

14. The apparatus of claim 11, wherein the first set of power control parameters include a first set of closed loop power control parameters and the second set of power control parameters include a second set of closed loop power control parameters.

15. The apparatus of claim 14, wherein an open loop power control parameter associated with the second set of power control parameters comprises an adjustment from an open loop power control parameter associated with the first set of power control parameters.

16. The apparatus of claim 15, wherein the first type of channel is transmitted in a first slot of the subframe and the first and second types of channels are transmitted in a second slot of the subframe.

17. The apparatus of claim 15, wherein the first type of channel is transmitted in a first slot of the subframe, and the second type of channel, but not the first type of channel, is transmitted in a second slot of the subframe.

18. The apparatus of claim 17, wherein the second type of channel includes uplink control information (UCI) originally intended to be transmitted on the first type of channel.

19. The apparatus of claim 18, wherein at least part of the UCI is dropped.

20. The apparatus of claim 11, wherein the first type of channel comprises a physical uplink control channel (PUCCH) and the second type of channel comprises a quick physical uplink shared channel (QPUSCH).

21. An apparatus for wireless communications, comprising:
means for using a first set of power control parameters for transmitting a first type of channel using a first transmission time interval (TTI) duration;
means for using a second set of power control parameters for transmitting a second type of channel using a second TTI duration;
means for detecting that the UE is scheduled to transmit, within a same subframe, the first type of channel having the first transmission time interval (TTI) duration spanning at least two slots of the subframe and the second type of channel having the second transmission time interval (TTI) duration spanning a single slot of the subframe; and
means for deciding, based on one or more conditions, whether to transmit the first type of channel, the second type of channel, or both, within the subframe.

22. The apparatus of claim 21, wherein the first set of power control parameters and second set of power control parameters implement the same closed loop power control parameters.

23. The apparatus of claim 21, wherein the first type of channel comprises a physical uplink control channel (PUCCH) and the second type of channel comprises a quick physical uplink shared channel (QPUSCH).

24. A non-transitory computer-readable medium having instructions stored thereon which, when executed by a processor, performs a method for wireless communications by a user equipment, the method comprising:
using a first set of power control parameters for transmitting a first type of channel using a first transmission time interval (TTI) duration;
using a second set of power control parameters for transmitting a second type of channel using a second TTI duration;

detecting that the UE is scheduled to transmit, within a same subframe, the first type of channel having the first transmission time interval (TTI) duration spanning at least two slots of the subframe and the second type of channel having the second transmission time interval (TTI) duration spanning a single slot of the subframe; and deciding, based on one or more conditions, whether to transmit the first type of channel, the second type of channel, or both, within the subframe.

\* \* \* \* \*